(12) United States Patent
Moring et al.

(10) Patent No.: US 10,319,013 B2
(45) Date of Patent: Jun. 11, 2019

(54) ELECTRONIC ORDERING SYSTEM

(71) Applicant: Square, Inc., San Francisco, CA (US)

(72) Inventors: Michael Dustin Moring, San Francisco, CA (US); Nathan Spindel, San Francisco, CA (US); Mark Jen, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 727 days.

(21) Appl. No.: 14/311,176

(22) Filed: Jun. 20, 2014

(65) Prior Publication Data

US 2015/0120509 A1     Apr. 30, 2015

Related U.S. Application Data

(60) Provisional application No. 61/896,607, filed on Oct. 28, 2013.

(51) Int. Cl.
*G06Q 30/00* (2012.01)
*G06Q 30/06* (2012.01)
(Continued)

(52) U.S. Cl.
CPC ......... *G06Q 30/0613* (2013.01); *G06Q 20/12* (2013.01); *G06Q 20/32* (2013.01);
(Continued)

(58) Field of Classification Search
CPC ............... G06Q 30/0635; G06Q 20/12; G06Q 30/0633; G06Q 30/0613; G06Q 30/0609; G06Q 30/06; G06Q 20/32
(Continued)

(56) References Cited

U.S. PATENT DOCUMENTS

| 6,026,375 A | 2/2000 | Hall et al. |
| 6,587,835 B1 | 7/2003 | Treyz et al. |

(Continued)

FOREIGN PATENT DOCUMENTS

| CA | 2 777 885 A1 | 5/2013 |
| DE | 20 2012 100 620 U1 | 8/2012 |

(Continued)

OTHER PUBLICATIONS

U.S. Appl. No. 61/563,022, filed Nov. 22, 2011 to which cited foreign reference DE 202012100620 published Aug. 2, 2012 and cited in the IDS filed Nov. 27, 2015 claims priority.*

(Continued)

*Primary Examiner* — Yogesh C Garg
(74) *Attorney, Agent, or Firm* — Polsinelli (57) ABSTRACT

Data describing a purchase order to be prepared by a merchant and an expected arrival time of a user for arriving at a geographic location of the merchant can be received. An order preparation time for the purchase order based on the one or more items specified in the purchase order can be determined. The order preparation time can be a time needed by the merchant to prepare the purchase order. An order start time based on the order preparation time for the purchase order and on the expected arrival time can be determined. The order start time can be a time for beginning preparation of the purchase order to have the purchase order ready at the expected arrival time. The data describing the purchase order and the order start time can be presented.

20 Claims, 4 Drawing Sheets

(51) Int. Cl.
*G06Q 20/12* (2012.01)
*G06Q 20/32* (2012.01)
*G06Q 20/40* (2012.01)

(52) U.S. Cl.
CPC ..... *G06Q 30/0609* (2013.01); *G06Q 30/0633* (2013.01); *G06Q 30/0635* (2013.01); *G06Q 20/40145* (2013.01); *G06Q 30/06* (2013.01)

(58) Field of Classification Search
USPC .... 705/28.1, 26.1, 26.41, 26.8, 26.81, 26.35
See application file for complete search history.

(56) References Cited

U.S. PATENT DOCUMENTS

| | | |
|---|---|---|
| 6,646,659 B1 | 11/2003 | Brown et al. |
| 6,839,682 B1 | 1/2005 | Blume et al. |
| 7,004,382 B2 | 2/2006 | Sandru |
| 7,024,205 B1* | 4/2006 | Hose ................ H04M 3/42357 455/456.1 |
| 7,207,480 B1 | 4/2007 | Geddes |
| 7,324,958 B2 | 1/2008 | Miyazaki et al. |
| 7,376,433 B1 | 5/2008 | Hose |
| 7,407,089 B2 | 8/2008 | Patrick |
| 7,680,690 B1 | 3/2010 | Catalano |
| 7,711,100 B2 | 5/2010 | Dennis |
| 7,730,151 B1 | 6/2010 | Fabbri et al. |
| 7,792,709 B1 | 9/2010 | Trandal et al. |
| 7,831,246 B1 | 11/2010 | Smith et al. |
| 7,831,520 B2 | 11/2010 | Mengerink |
| 7,848,765 B2 | 12/2010 | Phillips et al. |
| 7,970,418 B2 | 6/2011 | Schmidt et al. |
| 8,001,044 B2 | 8/2011 | Davis |
| 8,065,080 B2 | 11/2011 | Koch |
| 8,090,351 B2 | 1/2012 | Klein |
| 8,126,806 B1 | 2/2012 | DiMartino et al. |
| 8,135,624 B1 | 3/2012 | Ramalingam et al. |
| 8,140,418 B1 | 3/2012 | Casey et al. |
| 8,160,959 B2 | 4/2012 | Rackley, III et al. |
| 8,200,247 B1 | 6/2012 | Starenky et al. |
| 8,229,458 B2 | 7/2012 | Busch |
| 8,239,276 B2 | 8/2012 | Lin et al. |
| 8,285,604 B1 | 10/2012 | Trandal et al. |
| 8,369,842 B2 | 2/2013 | Proctor, Jr. et al. |
| 8,396,808 B2 | 3/2013 | Greenspan |
| 8,417,258 B2 | 4/2013 | Barnes, Jr. |
| 8,417,377 B2 | 4/2013 | Rothschild |
| 8,463,295 B1 | 6/2013 | Caralis et al. |
| 8,485,440 B1 | 7/2013 | Arora et al. |
| 8,504,073 B2 | 8/2013 | Svendsen et al. |
| 8,510,220 B2 | 8/2013 | Rackley, III et al. |
| 8,554,670 B1 | 10/2013 | Blank et al. |
| 8,635,157 B2* | 1/2014 | Smith ................ G06Q 20/20 705/39 |
| 8,645,366 B1 | 2/2014 | Acharya |
| 8,655,782 B2 | 2/2014 | Poon et al. |
| 8,659,427 B2 | 2/2014 | Brown et al. |
| 8,756,187 B2 | 6/2014 | Wilson et al. |
| 8,892,249 B2 | 11/2014 | Holman et al. |
| 8,898,288 B2 | 11/2014 | Petersen et al. |
| 8,918,355 B2 | 12/2014 | Perrier et al. |
| 8,972,297 B2 | 3/2015 | Kay et al. |
| 9,218,633 B2 | 12/2015 | Hulett et al. |
| 9,334,150 B1 | 5/2016 | Ost et al. |
| 9,373,112 B1 | 6/2016 | Henderson et al. |
| 9,589,290 B1 | 3/2017 | Hipschman et al. |
| 9,741,045 B1 | 8/2017 | Henderson et al. |
| 9,779,446 B1 | 10/2017 | Hipschman et al. |
| 9,799,034 B1 | 10/2017 | Varma et al. |
| 2002/0059147 A1 | 5/2002 | Ogasawara |
| 2002/0065728 A1 | 5/2002 | Ogasawara |
| 2002/0111907 A1 | 8/2002 | Ling |
| 2002/0174010 A1 | 11/2002 | Rice, III |
| 2002/0181710 A1 | 12/2002 | Adam et al. |
| 2002/0194121 A1 | 12/2002 | Takayama |
| 2002/0198806 A1 | 12/2002 | Blagg et al. |
| 2003/0004842 A1 | 1/2003 | Williams et al. |
| 2003/0061109 A1* | 3/2003 | Banerjee ............ G06Q 30/0281 705/346 |
| 2003/0069780 A1 | 4/2003 | Hailwood et al. |
| 2003/0204447 A1 | 10/2003 | Dalzell et al. |
| 2004/0093281 A1 | 5/2004 | Silverstein et al. |
| 2004/0236696 A1 | 11/2004 | Aoki et al. |
| 2004/0249497 A1 | 12/2004 | Saigh et al. |
| 2005/0271199 A1 | 12/2005 | Collins, Jr. |
| 2006/0093998 A1 | 5/2006 | Vertegaal |
| 2006/0138219 A1 | 6/2006 | Brzezniak et al. |
| 2006/0143073 A1 | 6/2006 | Engel et al. |
| 2006/0200305 A1 | 9/2006 | Sheha et al. |
| 2007/0022375 A1 | 1/2007 | Walker |
| 2007/0072678 A1 | 3/2007 | Dagres |
| 2007/0088624 A1 | 4/2007 | Vaughn et al. |
| 2007/0150375 A1* | 6/2007 | Yang ................... G06Q 10/08 705/339 |
| 2007/0203801 A1 | 8/2007 | Istfan |
| 2007/0214237 A1 | 9/2007 | Stibel et al. |
| 2007/0244778 A1 | 10/2007 | Ballard |
| 2007/0281689 A1 | 12/2007 | Altman et al. |
| 2008/0080682 A1 | 4/2008 | Ogunwale et al. |
| 2008/0084977 A1 | 4/2008 | Nayak et al. |
| 2008/0104199 A1 | 5/2008 | Kalaboukis |
| 2008/0142599 A1 | 6/2008 | Benillouche et al. |
| 2008/0154781 A1 | 6/2008 | Kumar |
| 2008/0172733 A1 | 7/2008 | Coriaty et al. |
| 2008/0207296 A1 | 8/2008 | Lutnick et al. |
| 2008/0294751 A1 | 11/2008 | Dreiling |
| 2008/0319843 A1 | 12/2008 | Moser et al. |
| 2009/0005987 A1 | 1/2009 | Vengroff et al. |
| 2009/0006156 A1 | 1/2009 | Hunt et al. |
| 2009/0030787 A1 | 1/2009 | Pon et al. |
| 2009/0048890 A1* | 2/2009 | Burgh ................... G06Q 10/04 705/7.15 |
| 2009/0063312 A1 | 3/2009 | Hurst |
| 2009/0076896 A1 | 3/2009 | DeWitt et al. |
| 2009/0076925 A1 | 3/2009 | DeWitt et al. |
| 2009/0125429 A1 | 5/2009 | Takayama |
| 2009/0177581 A1 | 7/2009 | Garcia et al. |
| 2009/0187492 A1 | 7/2009 | Hammad et al. |
| 2009/0204492 A1 | 8/2009 | Scifo et al. |
| 2009/0264070 A1 | 10/2009 | Lim |
| 2009/0298514 A1 | 12/2009 | Ullah |
| 2009/0313138 A1 | 12/2009 | Ratnakar |
| 2009/0313165 A1 | 12/2009 | Walter |
| 2010/0010906 A1 | 1/2010 | Grecia |
| 2010/0063889 A1 | 3/2010 | Proctor, Jr. et al. |
| 2010/0070369 A1 | 3/2010 | Fenton et al. |
| 2010/0070378 A1 | 3/2010 | Trotman et al. |
| 2010/0076853 A1 | 3/2010 | Schwarz |
| 2010/0082445 A1 | 4/2010 | Hodge et al. |
| 2010/0082455 A1 | 4/2010 | Rosenblatt et al. |
| 2010/0082487 A1 | 4/2010 | Nelsen |
| 2010/0114654 A1 | 5/2010 | Lukose et al. |
| 2010/0121726 A1 | 5/2010 | Coulter et al. |
| 2010/0125495 A1 | 5/2010 | Smith et al. |
| 2010/0125510 A1 | 5/2010 | Smith et al. |
| 2010/0174596 A1 | 7/2010 | Gilman et al. |
| 2010/0184416 A1 | 7/2010 | Gupta et al. |
| 2010/0216396 A1 | 8/2010 | Fernandez et al. |
| 2010/0250410 A1 | 9/2010 | Song et al. |
| 2010/0274597 A1 | 10/2010 | Dill |
| 2010/0306080 A1 | 12/2010 | Trandal et al. |
| 2010/0312385 A1 | 12/2010 | Deuber |
| 2011/0016051 A1 | 1/2011 | Trifiletti et al. |
| 2011/0022472 A1 | 1/2011 | Zon |
| 2011/0059784 A1 | 3/2011 | Lutnick et al. |
| 2011/0125566 A1 | 5/2011 | McLaughlin et al. |
| 2011/0153440 A1 | 6/2011 | Singhal |
| 2011/0172004 A1 | 7/2011 | Breitenbach et al. |
| 2011/0173041 A1 | 7/2011 | Breitenbach et al. |
| 2011/0184837 A1 | 7/2011 | Biro |
| 2011/0201317 A1 | 8/2011 | Karandikar et al. |
| 2011/0231292 A1 | 9/2011 | McCown |
| 2011/0238474 A1 | 9/2011 | Carr et al. |
| 2011/0238476 A1 | 9/2011 | Carr et al. |

(56) References Cited

U.S. PATENT DOCUMENTS

| | | |
|---|---|---|
| 2011/0238514 A1 | 9/2011 | Ramalingam et al. |
| 2011/0238517 A1 | 9/2011 | Ramalingam et al. |
| 2011/0249668 A1 | 10/2011 | Van Milligan et al. |
| 2011/0251892 A1 | 10/2011 | Laracey |
| 2011/0256881 A1 | 10/2011 | Huang et al. |
| 2011/0258058 A1 | 10/2011 | Carroll et al. |
| 2011/0260860 A1 | 10/2011 | Gupta |
| 2011/0276418 A1 | 11/2011 | Velani |
| 2011/0276419 A1 | 11/2011 | Johnson et al. |
| 2011/0313867 A9 | 12/2011 | Silver |
| 2012/0016731 A1 | 1/2012 | Smith et al. |
| 2012/0072350 A1 | 3/2012 | Goldthwaite et al. |
| 2012/0078673 A1* | 3/2012 | Koke ............... G06Q 10/06 705/7.13 |
| 2012/0078751 A1 | 3/2012 | MacPhail et al. |
| 2012/0089461 A1 | 4/2012 | Greenspan |
| 2012/0089470 A1 | 4/2012 | Barnes, Jr. |
| 2012/0109749 A1 | 5/2012 | Subramanian et al. |
| 2012/0109752 A1 | 5/2012 | Strutton et al. |
| 2012/0127490 A1 | 5/2012 | Ogasawara et al. |
| 2012/0130790 A1 | 5/2012 | Lyons et al. |
| 2012/0130794 A1 | 5/2012 | Strieder |
| 2012/0150605 A1 | 6/2012 | Isaacson et al. |
| 2012/0150611 A1 | 6/2012 | Isaacson et al. |
| 2012/0156337 A1 | 6/2012 | Studor |
| 2012/0179516 A1 | 7/2012 | Fakhrai et al. |
| 2012/0190386 A1 | 7/2012 | Anderson |
| 2012/0197724 A1 | 8/2012 | Kendall |
| 2012/0197743 A1 | 8/2012 | Grigg et al. |
| 2012/0209657 A1 | 8/2012 | Connolly |
| 2012/0209685 A1 | 8/2012 | Nealer et al. |
| 2012/0221421 A1 | 8/2012 | Hammad |
| 2012/0232994 A1 | 9/2012 | Kim et al. |
| 2012/0252418 A1 | 10/2012 | Kandekar et al. |
| 2012/0271692 A1 | 10/2012 | Huang et al. |
| 2012/0276928 A1 | 11/2012 | Shutter |
| 2012/0284769 A1 | 11/2012 | Dixon et al. |
| 2012/0290376 A1 | 11/2012 | Dyer et al. |
| 2012/0290421 A1 | 11/2012 | Qawami et al. |
| 2012/0290422 A1 | 11/2012 | Bhinder |
| 2012/0295639 A1 | 11/2012 | Fitoussi et al. |
| 2012/0303425 A1 | 11/2012 | Katzin et al. |
| 2012/0310824 A1 | 12/2012 | Liberty |
| 2012/0330769 A1 | 12/2012 | Arceo |
| 2013/0013499 A1 | 1/2013 | Kalgi |
| 2013/0024364 A1 | 1/2013 | Shrivastava et al. |
| 2013/0024375 A1 | 1/2013 | Choudhuri et al. |
| 2013/0024376 A1 | 1/2013 | Choudhuri et al. |
| 2013/0030913 A1 | 1/2013 | Zhu et al. |
| 2013/0030955 A1* | 1/2013 | David ............... G06Q 10/08 705/26.8 |
| 2013/0035114 A1 | 2/2013 | Holden et al. |
| 2013/0036048 A1 | 2/2013 | Campos et al. |
| 2013/0036051 A1 | 2/2013 | Giordano et al. |
| 2013/0040663 A1 | 2/2013 | Gold |
| 2013/0046589 A1 | 2/2013 | Grigg et al. |
| 2013/0054367 A1 | 2/2013 | Grigg et al. |
| 2013/0059598 A1 | 3/2013 | Miyagi et al. |
| 2013/0060623 A1 | 3/2013 | Walker et al. |
| 2013/0085860 A1 | 4/2013 | Summers et al. |
| 2013/0103760 A1 | 4/2013 | Golding et al. |
| 2013/0110658 A1 | 5/2013 | Lyman et al. |
| 2013/0117155 A1 | 5/2013 | Glasgo |
| 2013/0132140 A1 | 5/2013 | Amin et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0138500 A1 | 5/2013 | Charaniya et al. |
| 2013/0144674 A1 | 6/2013 | Kim et al. |
| 2013/0144702 A1 | 6/2013 | Tabor et al. |
| 2013/0151380 A1* | 6/2013 | Holt ............... G06Q 10/087 705/26.81 |
| 2013/0151419 A1 | 6/2013 | Hitchcock et al. |
| 2013/0159086 A1 | 6/2013 | Richard |
| 2013/0159119 A1 | 6/2013 | Henderson et al. |
| 2013/0169046 A1 | 7/2013 | Shin et al. |
| 2013/0178233 A1 | 7/2013 | McCoy et al. |
| 2013/0191195 A1 | 7/2013 | Carlson et al. |
| 2013/0191199 A1 | 7/2013 | Corner |
| 2013/0198076 A1 | 8/2013 | Zambelli Hosmer et al. |
| 2013/0218683 A1 | 8/2013 | Hannan |
| 2013/0218991 A1 | 8/2013 | McConnell et al. |
| 2013/0246207 A1 | 9/2013 | Novak et al. |
| 2013/0246301 A1 | 9/2013 | Radhakrishnan et al. |
| 2013/0248596 A1 | 9/2013 | Arora et al. |
| 2013/0282490 A1 | 10/2013 | Kramer et al. |
| 2013/0297321 A1 | 11/2013 | Raux et al. |
| 2013/0311315 A1 | 11/2013 | Zises |
| 2014/0012689 A1 | 1/2014 | Henderson et al. |
| 2014/0012757 A1 | 1/2014 | Henderson et al. |
| 2014/0012806 A1 | 1/2014 | Ching et al. |
| 2014/0045516 A1 | 2/2014 | Turgman et al. |
| 2014/0074610 A1 | 3/2014 | Bilange |
| 2014/0074743 A1 | 3/2014 | Rademaker |
| 2014/0108173 A1 | 4/2014 | Cooper et al. |
| 2014/0108177 A1* | 4/2014 | Erke ............... G06Q 30/0601 705/26.1 |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0156531 A1 | 6/2014 | Poon et al. |
| 2014/0195454 A1 | 7/2014 | Richie et al. |
| 2014/0257877 A1 | 9/2014 | L'Heureux et al. |
| 2014/0263630 A1 | 9/2014 | Richardson et al. |
| 2014/0278609 A1 | 9/2014 | Capps |
| 2014/0279123 A1 | 9/2014 | Harkey et al. |
| 2014/0289071 A1 | 9/2014 | Fox et al. |
| 2014/0289073 A1 | 9/2014 | Gold |
| 2014/0310182 A1 | 10/2014 | Cummins |
| 2014/0359510 A1* | 12/2014 | Graf ............... G01C 21/3614 715/771 |
| 2014/0379578 A1 | 12/2014 | Chan et al. |
| 2014/0379582 A1 | 12/2014 | Caglayan et al. |
| 2015/0031393 A1 | 1/2015 | Post et al. |
| 2015/0039462 A1 | 2/2015 | Shastry et al. |
| 2015/0046339 A1 | 2/2015 | Wong et al. |
| 2015/0081532 A1 | 3/2015 | Lewis et al. |
| 2015/0142604 A1 | 5/2015 | Kneen |
| 2015/0254699 A1 | 9/2015 | Bondesen et al. |
| 2015/0262244 A1 | 9/2015 | Rados et al. |
| 2015/0304806 A1 | 10/2015 | Vincent |
| 2015/0339648 A1 | 11/2015 | Kushevsky et al. |
| 2016/0125506 A1 | 5/2016 | Carr et al. |
| 2016/0169696 A1 | 6/2016 | Butts, III et al. |
| 2016/0210606 A1 | 7/2016 | Henderson et al. |
| 2017/0011450 A1 | 1/2017 | Frager et al. |
| 2017/0124567 A1 | 5/2017 | Henderson et al. |
| 2017/0270573 A1* | 9/2017 | Kim ............... G06Q 30/06 |

FOREIGN PATENT DOCUMENTS

| | | | | |
|---|---|---|---|---|
| WO | WO-2014032047 A1 * | 2/2014 | ............ | G06Q 30/06 |
| WO | 2015/066056 A1 | 5/2015 | | |
| WO | 2016/094500 A2 | 6/2016 | | |

OTHER PUBLICATIONS

Final Office Action dated Nov. 5, 2015, for U.S. Appl. No. 13/683,879, of Henderson, W., et al., filed Nov. 21, 2012.

Final Office Action dated Dec. 4, 2015, for U.S. Appl. No. 13/627,602, of Henderson, W., et al., filed Sep. 26, 2012.

Final Office Action dated Feb. 12, 2016, for U.S. Appl. No. 14/017,940, of Henderson, W., et al., filed Sep. 4, 2013.

Notice of Allowance dated Mar. 1, 2016, for U.S. Appl. No. 13/627,615, of Henderson, W., et al., filed Sep. 26, 2012.

Non-Final Office Action dated Apr. 22, 2016, for U.S. Appl. No. 13/683,879, of Henderson, W., et al., filed Nov. 21, 2012.

Non-Final Office Action dated Apr. 22, 2016, for U.S. Appl. No. 13/683,841, of Henderson, W., et al., filed Nov. 21, 2012.

Non-Final Office Action dated Apr. 22, 2016, for U.S. Appl. No. 14/498,975, of Varma, A.K., et al., filed Sep. 26, 2014.

(56) References Cited

OTHER PUBLICATIONS

Final Office Action dated Apr. 27, 2016, for U.S. Appl. No. 14/017,247, of Henderson, W., et al., filed Sep. 3, 2013.
Advisory Action dated Aug. 5, 2016, for U.S. Appl. No. 14/017,247, of Henderson, W., et al., filed Sep. 3, 2013.
Non-Final Office Action dated Aug. 29, 2016, for U.S. Appl. No. 13/627,602, of Henderson, W., et al., filed Sep. 26, 2012.
Notice of Allowance dated Oct. 7, 2016, for U.S. Appl. No. 14/017,940, of Henderson, W., et al., filed Sep. 4, 2013.
Notice of Allowance dated Oct. 24, 2016, for U.S. Appl. No. 13/683,879, of Henderson, W., et al., filed Nov. 21, 2012.
Final Office Action dated Oct. 31, 2016, for U.S. Appl. No. 14/498,975, of Varma, A.K., et al., filed Sep. 26, 2014.
Final Office Action dated Nov. 3, 2016, for U.S. Appl. No. 13/683,841, of Henderson, W., et al., filed Nov. 21, 2012.
Notice of Allowance dated Nov. 30, 2016, for U.S. Appl. No. 14/017,940, of Henderson, W., et al., filed Sep. 4, 2013.
Notice of Allowance dated Dec. 27, 2016, for U.S. Appl. No. 14/017,247, of Henderson, W., et al., filed Sep. 3, 2013.
"Uber—Android Apps on Google Play," dated Nov. 10, 2014, Retrieved from the Internet URL: https://play.google.com/store/apps/details?id=com.ubercab&hl=en, on Nov. 12, 2014, pp. 2.
Hachman, M., "MobilePay: Your Phone Is Your Credit Card," dated Sep. 28, 2010, Retrieved from the Internet URL: http://www.pcmag.com/article2/0,2817,2369877,00.asp, on Sep. 25, 2013, p. 1.
Justin, "Visa Enters the Location-Based Mobile Marketing Space With New iPhone App," dated Dec. 14, 2010, Retrieved from the Internet URL: http://www.mobilemarketingwatch.com/visa-enters-the-location-based-mobile-marketing-space-with-new-iphone-app-11875/, on Feb. 23, 2015, p. 1.
Siegler, MG., "MobilePay May Be the Death of the Wallet. Yes, for Real This Time," TechCrunch, dated Sep. 28, 2010, Retrieved from the internet URL: http://techcrunch.com/2010/09/28/mobilepayusa/, on Sep. 22, 2013, pp. 12.
Non-Final Office Action dated Aug. 23, 2013, for U.S. Appl. No. 13/627,615, of Henderson, W., et al., filed Sep. 26, 2012.
Non-Final Office Action dated Oct. 25, 2013, for U.S. Appl. No. 13/683,841, of Henderson, W., et al., filed Nov. 21, 2012.
Final Office Action dated Dec. 23, 2013, for U.S. Appl. No. 13/627,615, of Henderson, W., et al., filed Sep. 26, 2012.
Non-Final Office Action dated May 29, 2014, for U.S. Appl. No. 14/017,247, of Henderson, W., et al., filed Sep. 3, 2013.
Non-Final Office Action dated Sep. 23, 2014, for U.S. Appl. No. 13/627,615, of Henderson, W., et al., filed Sep. 26, 2012.
Final Office Action dated Dec. 18, 2014, for U.S. Appl. No. 13/627,615, of Henderson, W., et al., filed Sep. 26, 2012.
Non-Final Office Action dated Jan. 7, 2015, for U.S. Appl. No. 14/017,940, of Henderson, W., et al., filed Sep. 4, 2013.
Non-Final Office Action dated Jan. 9, 2015, for U.S. Appl. No. 14/498,975, of Varma, A., K., et al., filed Sep. 26, 2014.
Non-Final Office Action dated Mar. 17, 2015, for U.S. Appl. No. 13/683,879, of Henderson, W., et al., filed Nov. 21, 2012.
Advisory Action dated May 4, 2015, for U.S. Appl. No. 13/627,615, of Henderson, W., et al., filed Sep. 26, 2012.
Non-Final Office Action dated May 29, 2015, for U.S. Appl. No. 13/627,602, of Henderson, W., et al., filed Sep. 26, 2012.
Final Office Action dated Jul. 8, 2015, for U.S. Appl. No. 14/498,975, of Varma, A., K, et al., filed Sep. 26, 2014.
Non-Final Office Action dated Aug. 12, 2015, for U.S. Appl. No. 13/627,615, of Henderson, W., et al., filed Sep. 26, 2012.
Non-Final Office Action dated Aug. 26, 2015, for U.S. Appl. No. 14/017,247, of Henderson, W., et al., filed Sep. 3, 2013.
Non-Final Office Action dated Aug. 27, 2015, for U.S. Appl. No. 14/017,940, of Henderson, W., et al., filed Sep. 4, 2013.
International Search Report and Written Opinion for International Application No. PCT/US2014/062697, dated Feb. 10, 2015.
Examiner's Requisition for Canadian Patent Application No. 2,777,885, dated Apr. 5, 2017.
Notice of Allowance dated Apr. 12, 2017, for U.S. Appl. No. 13/627,602, of Henderson, W., et al., filed Sep. 26, 2012.
Non-Final Office Action dated May 1, 2017, for U.S. Appl. No. 14/498,922, of Varma, A.K., et al., filed Sep. 26, 2014.
Non-Final Action dated May 4, 2017, for U.S. Appl. No. 15/084,390, of Henderson, W., et al., filed Mar. 29, 2016.
Advisory Action dated Feb. 23, 2017, for U.S. Appl. No. 13/683,841, of Henderson, W., et al., filed Nov. 21, 2012.
Final Office Action dated Oct. 18, 2017, for U.S. Appl. No. 15/084,390, of Henderson, W., et al., filed Mar. 29, 2016.
Non-Final Office Action dated Nov. 2, 2017, for U.S. Appl. No. 14/453,526, of Jowdy, J. M. filed Aug. 6, 2014.
Final Office Action dated Nov. 22, 2017, for U.S. Appl. No. 14/498,912, of Varma, A.K. et al., filed Sep. 26, 2014.
Notice of Allowance dated Dec. 11, 2017, for U.S. Appl. No. 14/498,876, of Varma, A.K., et al., filed Sep. 26, 2014.
Non-Final Office Action dated Dec. 15, 2017, for U.S. Appl. No. 14/498,922, of Varma, A. K., et al., filed Sep. 26, 2014.
Notice of Allowance dated Jun. 20, 2017, for U.S. Appl. No. 14/498,975, of Varma, A.K., et al., filed Sep. 26, 2014.
Non-Final Office Action dated Jul. 10, 2017, for U.S. Appl. No. 14/498,876, of Varma, A.K. et al., filed Sep. 26, 2014.
Non-Final Office Action dated Jul. 13, 2017, for U.S. Appl. No. 14/498,912, of Varma, A.K. et al., filed Sep. 26, 2014.
Non-Final Office Action dated Aug. 11, 2017, for U.S. Appl. No. 13/683,841, of Henderson, W., et al., filed Nov. 21, 2012.
Final Office Action dated Aug. 16, 2017, for U.S. Appl. No. 14/498,922, of Varma, A. K., et al., filed Sep. 26, 2014.
Non Final Office Action dated Mar. 3, 2015, for U.S. Appl. No. 14/587,758, of Hipschman, D., et al., filed Dec. 31, 2014.
Non-Final Office Action dated Apr. 2, 2015, for U.S. Appl. No. 14/587,984, of Hipschman, D., et al., filed Dec. 31, 2014.
Final Office Action dated Sep. 25, 2015, for U.S. Appl. No. 14/587,758, of Hipschman, D., et al., filed Dec. 31, 2014.
Final Office Action dated Sep. 25, 2015, for U.S. Appl. No. 14/587,984, of Hipschman, D., et al., filed Dec. 31, 2014.
Non-Final Office Action dated Oct. 7, 2015, for U.S. Appl. No. 14/587,913, of Hipschman, D., et al., filed Dec. 31, 2014.
Advisory Action dated Feb. 19, 2016, for U.S. Appl. No. 14/587,984, of Hipschman, D., et al., filed Dec. 31, 2014.
Non-Final Office Action dated Apr. 4, 2016, for U.S. Appl. No. 14/587,984, of Hipschman, D., et al., filed Dec. 31, 2014.
Non-Final Office Action dated Apr. 21, 2016, for U.S. Appl. No. 14/587,758, of Hipschman, D., et al., filed Dec. 31, 2014.
Final Office Action dated Sep. 8, 2016, for U.S. Appl. No. 14/587,913, of Hipschman, D., et al., filed Dec. 31, 2014.
Notice of Allowance dated Oct. 13, 2016, for U.S. Appl. No. 14/587,984, of Hipschman, D., et al., filed Dec. 31, 2014.
Final Office Action dated Nov. 4, 2016, for U.S. Appl. No. 14/587,758, of Hipschman, D., et al., filed Dec. 31, 2014.
Advisory Action dated Dec. 12, 2016, for U.S. Appl. No. 14/587,913, of Hipschman, D., et al., filed Dec. 31, 2014.
Non-Final Office Action dated Mar. 9, 2017, for U.S. Appl. No. 14/588,044, of Hipschman, D., et al., filed Dec. 31, 2014.
Advisory Action dated Mar. 13, 2017, for U.S. Appl. No. 14/587,758, of Hipschman, D., et al., filed Dec. 31, 2014.
Notice of Allowance dated Apr. 21, 2017, for U.S. Appl. No. 14/587,758, of Hipschman, D., et al., filed Dec. 31, 2014.
Non-Final Office Action dated May 19, 2017, for U.S. Appl. No. 14/464,276, of Johnson, L., et al., filed Aug. 20, 2014.
Notice of Allowance dated May 23, 2017, for U.S. Appl. No. 14/587,913, of Hipschman, D., et al., filed Dec. 31, 2014.
Final Office Action dated Jul. 20, 2017, for U.S. Appl. No. 14/588,044, of Hipschman, D., et al., filed Dec. 31, 2014.
Non-Final Office Action dated Sep. 20, 2017, for U.S. Appl. No. 14/587,758, of Hipschman, D., et al., filed Dec. 31, 2014.
Final Office Action dated Nov. 24, 2017, for U.S. Appl. No. 14/464,276, of Johnson, L., et al., filed Aug. 20, 2014.
Non-Final Office Action dated Jan. 29, 2018, for U.S. Appl. No. 14/568,905, of Butts, J.F., et al., filed Dec. 12, 2014.
Non-Final Office Action dated Apr. 9, 2018, for U.S. Appl. No. 14/588,044, of Hipschman, D., et al., filed Dec. 31, 2014.
Non-Final Office Action dated Apr. 20, 2018, for U.S. Appl. No. 14/464,276, of Johnson, L., et al., filed Aug. 20, 2014.

(56) References Cited

OTHER PUBLICATIONS

International Search Report and Written Opinion for PCT Application No. PCT/US2015/064671 dated Feb. 23, 2016.
Extended European Search Report for European Patent Application No. 15867710.4, dated Sep. 14, 2017.
Advisory Action dated Jan. 30, 2018, for U.S. Appl. No. 14/498,912, of Varma, A.K, et al., filed Sep. 26, 2014.

* cited by examiner

ELECTRONIC ORDERING SYSTEM

CROSS-REFERENCE TO RELATED APPLICATIONS

This application claims the benefit of U.S. Provisional Patent Application No. 61/896,607, entitled "ELECTRONIC ORDERING SYSTEM", filed on Oct. 28, 2013, and which is hereby expressly incorporated herein by reference in its entirety.

BACKGROUND

Items offered for sale by merchants, e.g., restaurants, can be purchased by customers in various ways. For example, customers can visit a merchant's brick-and-mortar store and purchase items in person. In some instances, a customer can purchase items from the merchant by placing an order for items through the merchant's website or by calling the merchant using a phone. The customer can generally provide payment to the merchant at the time of receiving the items, for example, by providing cash or a credit card, or at the time of placing the order, for example, by providing a credit card to the merchant through the merchant's website or over the phone. Once the order is received, the merchant will typically process the requested items for the customer to pick-up from the merchant's brick-and-mortar store or for delivery to the customer. In most cases, orders received by the merchant are processed on a first-come, first-served basis. Additionally, merchants may provide the customer with an estimated order completion time so that the customer can make arrangements for delivery or to pick-up the order.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to placing purchase orders for items being sold by merchants. In particular, various embodiments of the present disclosure can provide a method for determining a start time for preparing a user's purchase order based on an expected arrival time for the user arriving at a geographic location of a merchant.

A customer operating a computing device can interact with an application running on the computing device, or a web-browser interface, to access an electronic catalogue of items that are offered for sale by a merchant. The customer can select one or more items for pick-up or dine-in, and can electronically submit a purchase order for the items to the merchant through the computing device, for example, by sending, over a network, data describing the purchase order to a merchant device. When sending data describing the customer's purchase order, the computing device can also send data describing location data for the customer, for example, as determined from a geographic location of the computing device. In some embodiments, the computing device can send location data describing the customer's expected arrival time for reaching the merchant's location.

After receiving the customer's purchase order and the customer's expected arrival time, the merchant can determine when to start preparing items in the customer's purchase order. That is, the merchant can evaluate the items in the customer's purchase order to determine an order preparation time for preparing the customer's purchase order. The merchant can then determine, based on the order preparation time and on the customer's expected arrival time, when to begin preparing the customer's purchase order so that the order is ready for pick-up or dine-in at or near the time of the user's expected arrival time. The merchant device can continue to adjust the order start time using updated location data that is provided by the computing device or by polling the computing device for location data. In some instances, the merchant can adjust the order start time based on electronic messages received from the customer that specify the customer's expected arrival or a time delay in the customer's expected arrival time.

One advantage of using customer location data to determine when to prepare purchase orders allows merchants to better manage the preparation of other purchase orders awaiting completion. For example, if a first user that submitted a purchase order is not expected to arrive until much later than a second user that submitted a purchase order after the first user, then the merchant can prioritize the preparation of the second user's purchase order over the first user's purchase order. The ability to prioritize and de-prioritize purchase orders based on expected arrival times for customers allows merchants to more efficiently allocate their resources, e.g., staff, while improving customer satisfaction. In other words, customer experience with the merchant can be improved as a result of having customer purchase orders ready for pick-up or dine-in by the time the customers arrive at the merchant's location. This feature is especially advantageous in the food service industry where there is a demand for freshly prepared food.

Other advantages, variations, and functions are described and suggested below as may be provided in accordance with the various embodiments.

Figure 1:
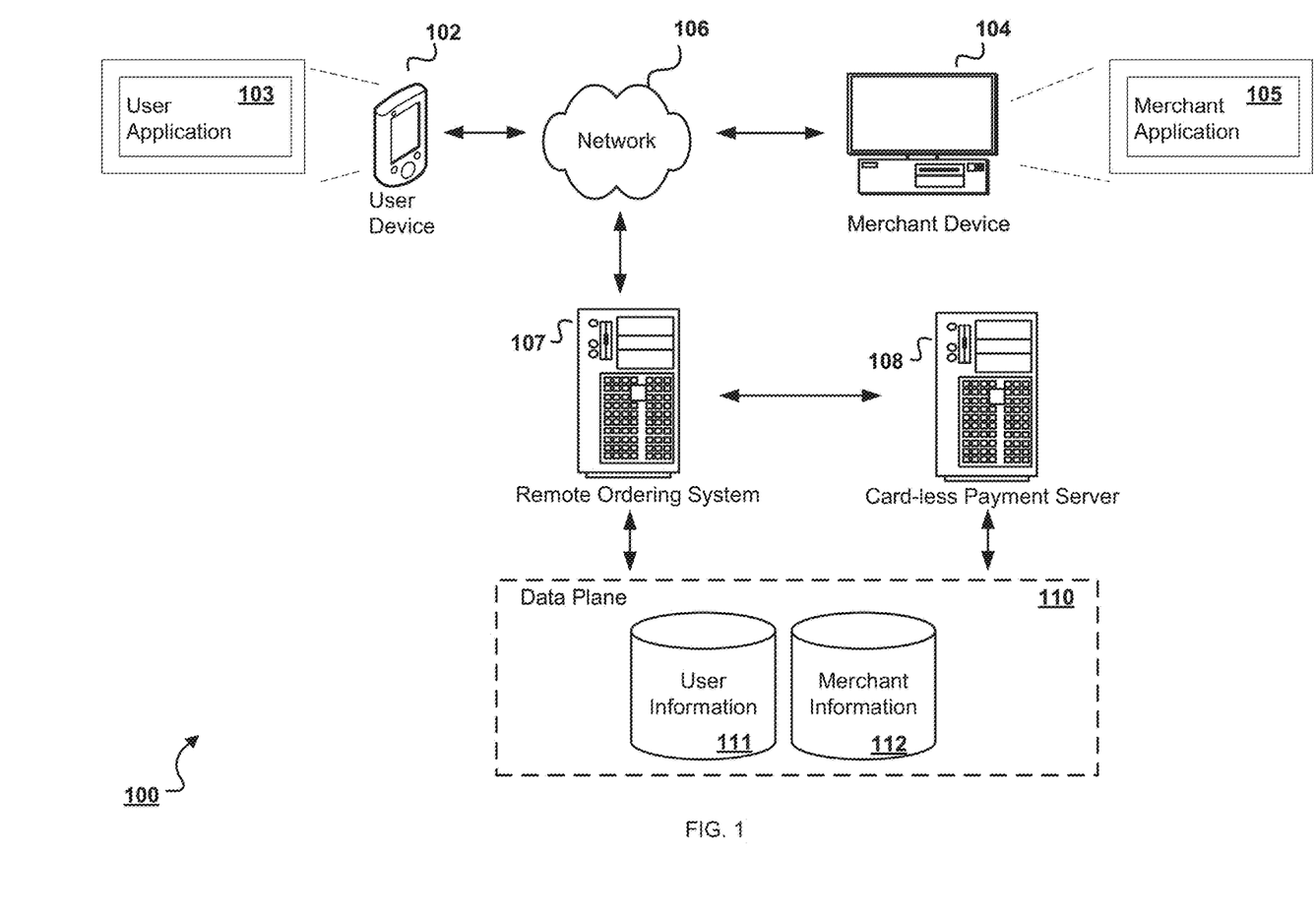
FIG. 1 illustrates an example of an environment for implementing aspects in accordance with various embodiments.

FIG. 1 illustrates an example of an environment 100 for implementing aspects in accordance with various embodiments. Although a mobile device environment is described for purposes of explanation, different environments may be used, e.g., a web-based environment, to implement various embodiments.

The example environment 100 includes an ordering system 107 and a data plane 110. The ordering system 107 is configured to receive and communicate purchase orders for items that can be purchased from merchants, as described below. The ordering system 107 can be implemented as computer programs on one or more computers in one or more locations, in which the systems, components, and techniques described below can be implemented.

Merchants, e.g., shopkeepers, can publish electronic catalogues that describe items, e.g., goods or services, that are available for purchase from the merchant through the ordering system 107. For example, a merchant can create an electronic catalogue by interacting with a software application, e.g., a merchant application 105, running on the merchant device 104.

As used in this specification, an electronic catalogue refers to a digital listing of one or more items, e.g., goods or services, that can be purchased from a merchant. The listing of items need not be organized in any particular manner and may simply be an itemized listing of goods or services, e.g., a restaurant menu.

The merchant device 104 can be a computer coupled to the ordering system 107 through a data communication network 106, e.g., the Internet. The merchant device 104 generally includes a memory, e.g., a random access memory (RAM), for storing instructions and data, and a processor for executing stored instructions. The merchant device 104 can be any appropriate device operable to send and receive requests, messages, or other types of information over the network 106. The merchant device 104 can also include a display screen though which a merchant interacting with the merchant device 104 can view information, e.g., information describing orders that were received from customers. Some examples of merchant devices include point-of-sale systems, personal computers, cellular phones, handheld messaging devices, laptop computers, personal data assistants, tablet devices, and the like.

Other ways of creating and publishing electronic catalogues are possible. For example, in some embodiments, a merchant can interact with a web browser running on the merchant device 104 to create and publish electronic catalogues through a web-based interface that is provided by the ordering system 107.

When creating electronic catalogues, a merchant can interact with the merchant application 105 to specify, for each item in an electronic catalogue, additional information that describes the item including, for example, an item name, description, cost, and one or more types of media files that describe the item, e.g., images, videos, and audio. Further, the merchant can specify one or more customization options for a particular item. Customization options for an item can vary depending on the item type. For example, a merchant that sells pizzas may allow customers to customize their pizza by specifying certain ingredients to include or exclude. Similarly, a merchant that sells custom-made clothing may allow customers to specify a size and color.

Once an electronic catalogue has been created, the merchant can interact with the merchant device 104 to communicate data describing the electronic catalogue to the ordering system 107 over the network 106. The ordering system 107 can store the data describing the electronic catalogue in a database, e.g., the merchant information database 112, and can provide the electronic catalogue to users to browse and select items for purchase, as described below. The merchant information database 112 can also store other information describing merchants including, for example, a merchant name, contact information, e.g., street address and telephone numbers, theme, e.g., color motif and logos, and merchant account information for processing card-less payments, as described below. The ordering system 107 can use the information stored in the merchant information database 112 to customize the appearance of an interface that presents a merchant's electronic catalogue.

The network 106 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The merchant device 104 and the user device 102 can communicate over the network using wired or wireless connections, and combinations thereof.

Users, e.g., customers, can interact with the ordering system 107 to view and purchase items from electronic catalogues that were published by merchants. For example, a user can interact with a software application, e.g., a user application 103, running on the user device 102 to access a merchant's electronic catalogue on a display screen of the user device 102. The user device 102 can be a computer coupled to the ordering system 107 through a data communication network 106, e.g., the Internet. The user device 102 generally includes a memory, e.g., a random access memory (RAM), for storing instructions and data, and a processor for executing stored instructions. The user device 102 can include one or more components, e.g., software or hardware, that are configured to determine a geographic location of the user device 102 using, for example, various geolocation techniques, e.g., a global positioning system (GPS). Further, the user device 102 can be any appropriate device operable to send and receive requests, messages, or other types of information over the network 106. Some examples of user devices include personal computers, cellular phones, handheld messaging devices, laptop computers, personal data assistants, tablet devices, and the like.

Other ways of accessing electronic catalogues are possible. For example, in some embodiments, a user can interact with a web browser running on the user device 102 to access electronic catalogues through a web-based interface that is provided by the ordering system 107.

As described above, a user operating the user device 102 can access electronic catalogues through the ordering system 107. For example, the user can interact with the user application 103 to submit a merchant search query to the ordering system 107 to request electronic catalogues that were provided by a specific merchant. Alternatively, the user can interact with the user application 103 to obtain a listing of merchants. The user can then interact with the user application 103 to select a merchant in the listing of merchants to view that merchant's respective electronic catalogues on a display screen of the user device 102.

After receiving the user's merchant search query, or the user's selection of a merchant from the listing of merchants, the ordering system 107 can, in response, communicate data describing the merchant to the user device 102 over the network 106. The data describing the merchant can include merchant information, e.g., merchant name, description, contact information, location, business hours, user ratings and reviews for the merchant, and one or more electronic catalogues of items that describe items that are available for purchase from the merchant. The data describing the merchant can be presented through the user application 103 on a display screen of the user device 102. For example, the user can interact with the user application 103 to view the merchant's information, e.g., location, business hours, and user ratings and reviews for the merchant. The user can also interact with the user application 103 to browse the merchant's electronic catalogue. The electronic catalogue can be presented in the user application 103 as a listing of one or more items that are available for purchase from the merchant. The listing of items can include, for each item, an item name, description, cost, and one or more customization options, as described above. In some embodiments, the data describing the merchant is themed using a merchant specified theme, e.g., logos and color motifs.

The user can interact with the user application 103 to select one or more items in the merchant's electronic catalogue for purchase. The user can then place a purchase order for the selected items through the user application 103. The user device 102 can communicate data describing the user's purchase order to the ordering system 107 through the network 106. The data describing the user's purchase order can include, for example, items that the user selected for purchase, respective quantities of the selected items, and customization options specified by the user for the selected items.

When placing a purchase order, the user may also specify whether the order is for delivery or pick-up. In some instances, when the merchant is a food service establishment, e.g., a restaurant, the user may specify that the order is an advance order for a dine-in visit. The user may also specify payment options for the order depending on the types of payment options that are accepted by a merchant. For example, the user may specify that the user will pay with cash at the time of delivery or pick-up. Alternatively, the user may opt to pay for the order using a financial card, e.g., a credit card. When paying with a financial card, the user device 102 can also communicate data describing the user's financial card, e.g., credit card number, expiration date, and security code, to the ordering system 107, for payment processing. In some embodiments, the user can pay for the order through a card-less payment transaction that is processed using a card-less payment server 108, as described below in reference to FIG. 4.

Once the purchase order is received, the ordering system 107 can communicate data describing the user's purchase order to the merchant device 104. The merchant can interact with the merchant application 105 to view details describing the user's purchase order and can begin processing the order.

In some embodiments, in addition to communicating data describing the user's purchase order, the user device 102 also communicates, to the ordering system 107, location data that describes a geographic location of the user device 102. The user device 102 may use various geolocation techniques, mapping services, e.g., a web mapping service application, or both, to determine other types of location data to be communicated to the ordering system 107. For example, the user device 102 can be configured to obtain and communicate data that describes a travel distance, e.g., in terms of feet, miles, or kilometers, from a user's geographic location to a geographic location of a merchant. The geographic location of the merchant can be determined, for example, based on a geographically identifiable address, e.g., a street address that was provided by the merchant. In another example, the user device 102 can be configured to obtain and communicate data that describes a user's arrival time for reaching a geographic location of a merchant. The arrival time can be expressed as an actual time at which the user will arrive at the geographic location of the merchant, e.g., 8:35 pm, or a number of minutes at which the user will arrive at the geographic location of the merchant, e.g., 35 minutes.

In some embodiments, the user device 102 is configured to communicate, to the ordering system 107, location data that describes a geographic location of the user device 102. The ordering system 107 is configured to determine, based on the received location data, a travel distance from a user's geographic location to a geographic location of a merchant or a user's arrival time for reaching a geographic location of a merchant. Although the user device 102 can be configured to communicate the user's location data at the time of placing an order, in some embodiments, the user device 102 is configured to also communicate the user's location data to the ordering system 107 at specified time intervals, e.g., every 30 seconds or every minute. Similarly, in some embodiments, the ordering system 107 is configured to poll the user device 102 for location data at specified time intervals.

The ordering system 107 can communicate the user's location data to the merchant device 104 when communicating the data describing the user's purchase order. In some embodiments, the ordering system 107 continues to communicate the user's location data to the merchant device 104 at specified time intervals to provide the merchant with updates of the user's travel distance or arrival time. The merchant can interact with the merchant application 105 to view details describing the user's purchase order and location data. In some embodiments, the merchant can interact with the merchant application 105 to view a geographic map indicating locations of the users that have placed orders with the merchant. For example, the merchant application 105 can display a geographic map that identifies each user that has placed an order with the merchant using a respective icon. The displayed map can be interactive in that the merchant can select an icon associated with a particular user to view details describing that particular user's purchase order and location data. Further, the map can be updated as the users move to show updated geographic locations of the users with respect to the merchant's location.

In some embodiments, the user can send electronic messages to the merchant through the ordering system 107 after the user's purchase order has been sent to the merchant. For example, the user can interact with the user application 103 to send the merchant additional instructions or to update the merchant on the user's arrival time. Other ways of communicating electronic messages from the user to the merchant are possible including, for example, e-mail and text messages. The merchant can view and respond to electronic messages that were sent by the user through, for example, the merchant application 105.

FIG. 1 describes placing purchase orders between users and merchants through the ordering system 107. However, other implementations are possible to allow the operations described in this specification to be performed between the user device 102 and the merchant device 104 without the ordering system 107. For example, in some embodiments, the user application 103 is configured to communicate directly with the merchant device 104. That is, the user device 102 can communicate, to the merchant device 104, the user's purchase orders, location data, and electronic messages directly over the network 106. In such embodiments, the merchant device 104 can receive updates to the user's location data from the user device 102 at specified time intervals. Similarly, in some embodiments, the merchant application 105 in the merchant device 104 can be configured to poll the user device 102 for location data at specified time intervals.

In some embodiments, the merchant prepares, e.g., manufactures, assembles, or creates, items in the user's purchase order based in part on the user's location data. For example, upon receiving the user's purchase order, the merchant can evaluate the order, e.g., based on the items included in the order and on the respective quantities ordered, to determine an order preparation time. The order preparation time can be an estimated amount of time that the merchant needs to prepare the user's order. Based on the order preparation time and on the user's arrival time for reaching the merchant's location, the merchant can determine an order start time for beginning preparation of the user's purchase order.

For example, a first user's purchase order may request three salads, four sandwiches, and two desserts from a merchant. The merchant can evaluate the order to determine an order preparation time. That is, the merchant may determine that preparation of three salads, four sandwiches, and two desserts will require 10 minutes of preparation time based on the resources, e.g., staff, available. The merchant can then determine an order start time for beginning preparation of the first user's purchase order by also evaluating the first user's arrival time for reaching the merchant's location. In this example, assuming the first user's arrival time for reaching the merchant's location is 20 minutes, the merchant can determine, based on a difference between the first user's arrival time, e.g., 20 minutes, and the order preparation time, e.g., 10 minutes, that the merchant can begin preparing the order in 10 minutes to have the order ready by the time the first user arrives at the merchant's location.

In some embodiments, the order preparation time is automatically determined using, for example, the ordering system 107. For example, the merchant can specify, for each item in the merchant's electronic catalogue, a respective item preparation time. When a user's purchase order is received, the ordering system 107 can evaluate the order to identify the items being purchased along with their respective quantities. The ordering system 107 can then generate an order preparation time for the user's order based on the items being purchased, their respective quantities, and the respective item preparation times, as specified by the merchant. In some embodiments, the item preparation times are adjusted based on a delay parameter specified by the merchant. For example, in some instances, the merchant may experience high demand during certain hours of the day. In such situations, the merchant can specify a delay parameter using, for example, the merchant application 103, to adjust order preparation times for purchase orders. In some embodiments, the order preparation time is adjusted based on a delay parameter specified by the merchant. For example, a purchase order that would generally have an order preparation time of 15 minutes can be adjusted automatically to 32 minutes based on a specified delay parameter of 17 minutes. In some embodiments, the delay parameter is determined automatically based on evaluating a merchant's aggregate purchase order history for certain days and times and on actual order preparation times.

Having the user's location data available can allow the merchant to better manage the preparation of other purchase orders that the merchant has received. For example, the merchant can evaluate other purchase orders that were received from different users, along with respective order preparation times for those orders and expected arrival times, to determine whether certain orders should be prioritized or de-prioritized. By prioritizing and de-prioritizing certain orders, the merchant can time the preparation of orders so that a user's order is ready at or near the time the user arrives at the merchant's location.

Continuing with the example above, after receiving the first user's order the merchant may receive a second user's order that has an order preparation time of 3 minutes and an arrival time of 5 minutes for the second user to reach the merchant's location. In this example, based on the information described above, the merchant can determine that the second user's order should be prioritized over the first user's order to have the second user's order complete and ready by the time the second user arrives at the merchant's location, e.g., within the next 5 minutes. The merchant can then prepare the first user's order after completing the second user's order and have the first user's order ready by the time the first user arrives at the merchant's location, e.g., within the next 20 minutes.

In some embodiments, the merchant can continually prioritize and de-prioritize orders based in part on updated location data that is received for the users that placed the orders. For example, in the example above, the second user may experience traffic delays that result in increasing the second user's arrival time for reaching the merchant's location to 30 minutes. In response, the merchant can re-prioritize the first user's order over the second user's order to have their respective orders ready at a time that coincides with their respective arrivals at the merchant's location.

In some embodiments, the merchant can prioritize and de-prioritize orders based in part on electronic messages that were received from users providing the merchant with an updated arrival time. For example, the first user may stop at a grocery store to pick up items before picking up the order from the merchant's location. In this situation, the first user can send an electronic message to the merchant notifying the merchant of a 10-minute delay. In response, the merchant can decide, based on the first user's electronic message and on the first user's arrival time, whether to prioritize or de-prioritize the first user's order over other orders.

In some instances, the merchant may be experiencing a delay in preparing orders and may want to update users on the status of their respective orders. Thus, in some embodiments, the merchant can interact with the merchant device 104, e.g., using the merchant application 105, to send electronic messages to users to provide them with an updated time for preparing their respective orders. In some embodiments, the merchant may specify a time delay for completing orders, e.g., a specified number of minutes before the merchant will begin preparing the user's order. This specified time delay could be published with the merchant's electronic catalogue to inform users of the delay before the users place an order with the merchant.

Merchants can also perform various actions based in part on the user's travel distance from the merchant's location. In some embodiments, one or more actions are triggered in response to a user entering a merchant's geofence. For example, a merchant can define a geofence that includes the merchant's location or covers some virtual perimeter from the merchant's location. As the user travels, the user device, e.g., the user device 102, can provide updated location data to the ordering system 107 or the merchant device 104, depending on the implementation. Based on the user's updated location data, the merchant device 104 can determine whether the user has entered the merchant's geofence.

In response to determining that the user has entered the merchant's geofence, the merchant device 104 can generate one or more alerts indicating that the user has arrived at the merchant's location or is within some geographic distance from the merchant's location. Based on this information, the merchant take one or more actions including, for example, beginning preparation of the user's order or bringing the user's prepared order to the counter. The merchant can also generate a bill for the user's order in response to the user entering the merchant's geofence. For example, in response to the user entering the geofence, a cashier operating the merchant device 104 can interact with the merchant application 105 to generate a bill, e.g., receipt, for the total amount of the user's order and can collect payment from the user. The user can pay for the bill using cash, a financial card, or through a card-less transaction, as described below. The merchant application 105 can also prompt a greeting for the user. Further, when the user enters the merchant's geofence, the merchant application 105 can prompt the merchant's staff to bring the user's order from the kitchen to the pick-up counter.

In some embodiments, depending on the implementation, one or more actions are triggered in response to the user exiting the merchant's geofence or while the user is still within the merchant's geofence. For example, the merchant device 104 can communicate one or more electronic messages that, for example, thank the user for visiting the merchant's location, provide the user with digital coupons that are redeemable through the merchant, provide the user with an option to enroll in a rewards program that is offered by the merchant, or request feedback from the user. In some embodiments, the user can interact with the user application 103 to submit feedback for the merchant, for example, on the quality of the order, or to suggest new menu items.

FIG. 1 describes an example environment in which the merchant device 104 is configured to perform the merchant operations described in this specification. However, in some instances, a merchant's business may have multiple devices that are configured to perform different tasks. For example, the merchant may have a point-of-sale system, e.g., a front-of-house system, that is configured to receive purchase orders and to communicate data describing the purchase orders to an order ticketing system, e.g., a back-of-house system. The order ticketing system can, for example, notify kitchen staff of purchase orders that need to be prepared.

Thus, in some embodiments, the merchant device 104 includes a point-of-sale system, e.g., a front-of-house system, and an order ticketing system, e.g., a back-of-house system. The front-of-house system is configured to receive, through the network 106, user purchase orders, user location data, and electronic messages sent from users, as described above. The front-of-house system can communicate data describing the received purchase orders, location data, and electronic messages to the back-of-house system. The back-of-house system can present the received data, for example, on a display screen, so that staff can prepare a user's purchase order based in part on the user's location data, as described above. For example, the staff can determine, for a user's purchase order, an order start time for beginning preparation of the purchase order by evaluating the user's arrival time for reaching the merchant's location.

The staff can also prioritize and de-prioritize purchase orders based on user location data, e.g., user travel distances, user arrival times for reaching the merchant's location, and based on electronic messages received from users, as described above. In some embodiments, the back-of-house system is configured to generate and present staff with an order preparation time for a user's order based on the items being purchased, their respective quantities, and the respective item preparation times that were specified by the merchant, as described above.

In some embodiments, the front-of-house system can generate, and communicate to the back-of-house system, one or more alerts in response to a user entering a merchant's geofence, as described above. For example, the front-of-house system can determine that a user has arrived at the merchant's location or is within threshold geographic distance from the merchant's location. Based on this information, the front-of-house system can communicate instructions to the back-of-house system to begin preparing the user's order or to bring the user's prepared order to the counter. The front-of-house system can also generate a bill for the user's order in response to the user entering the merchant's geofence, as described above. Further, as described above, the front-of-house system can be configured to perform actions in response to the user exiting the merchant's geofence.

In some embodiments, users can configure recurring purchase orders for particular items to be placed at specified intervals, e.g., daily, weekly, monthly, etc., and, optionally, at specific times. For example, a user can place a recurring order with a merchant for morning coffee to be picked up from the merchant's location daily at 8:00 am. The merchant can determine when the user is going to arrive at the merchant's location, as described above, to prepare the user's order and have it ready for the user at the user's requested time or, in situations when the user is off schedule, at or near the time the user arrives at the merchant's location.

The ordering system 107 can store data describing purchase orders that were received for merchants in the merchant information database 112 including, for example, times the orders were placed, e.g., particular days or time of day, users that placed the orders, preparation times for completing the orders, and items that were most requested. Merchants can use this data to improve their businesses. For example, based on this data, a merchant can identify customers that regularly place orders with the merchant. The customers identified can be selected, for example, to be enrolled a rewards program or can be offered digitally accessible coupons, e.g., through the user application 103. In some instances, a merchant can use the data to determine customer demand for particular days, weeks, months, or times of day. By determining customer demand, the merchant can, for example, better evaluate staffing decisions.

In some embodiments, the ordering system 107, and similar components, can be considered to be part of the card-less payment server 108. The handling of all requests and responses, as well as the delivery of content between the user device 102, the merchant device 104, and the ordering server 107, can be handled by the card-less payment server 108. The ordering system 107 and card-less payment server 108 are merely example components. However, more or fewer components can be used as structured code can be executed on any appropriate device or host machine as discussed elsewhere herein.

The data plane 110 includes one or more resources, servers, hosts, instances, routers, switches, data stores, other similar components, or a combination thereof. The resources of the data plane 110 are not limited to storing and providing access to data. Indeed, there may be several map servers, layers, or other elements, processes, or components, which may be chained or otherwise configured, and which can interact to perform tasks including, for example, obtaining data from an appropriate data store. As used in this specification, the term "data store" refers to any device or combination of devices capable of storing, accessing, and retrieving data, which may include any combination and number of data servers, databases, data storage devices, and data storage media, in any standard, distributed, or clustered environment.

The data stores of the data plane 110 can include several separate data tables, databases, or other data storage mechanisms and media for storing data relating to a particular aspect. For example, the data plane 110 illustrated includes mechanisms for storing merchant information 112 and user information 111, which can be used to serve content. The data plane 110 is operable, through logic associated therewith, to receive instructions from the ordering system 107 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment including several computer systems and components that are interconnected through one or more communication links, using one or more computer networks or direct connections. However, the system described above can be configured to operate equally well using fewer or a greater number of components than are illustrated in FIG. 1. Thus, the system 100 in FIG. 1 is provided merely as one example, and does not limit the scope of the disclosure.

Figure 2:
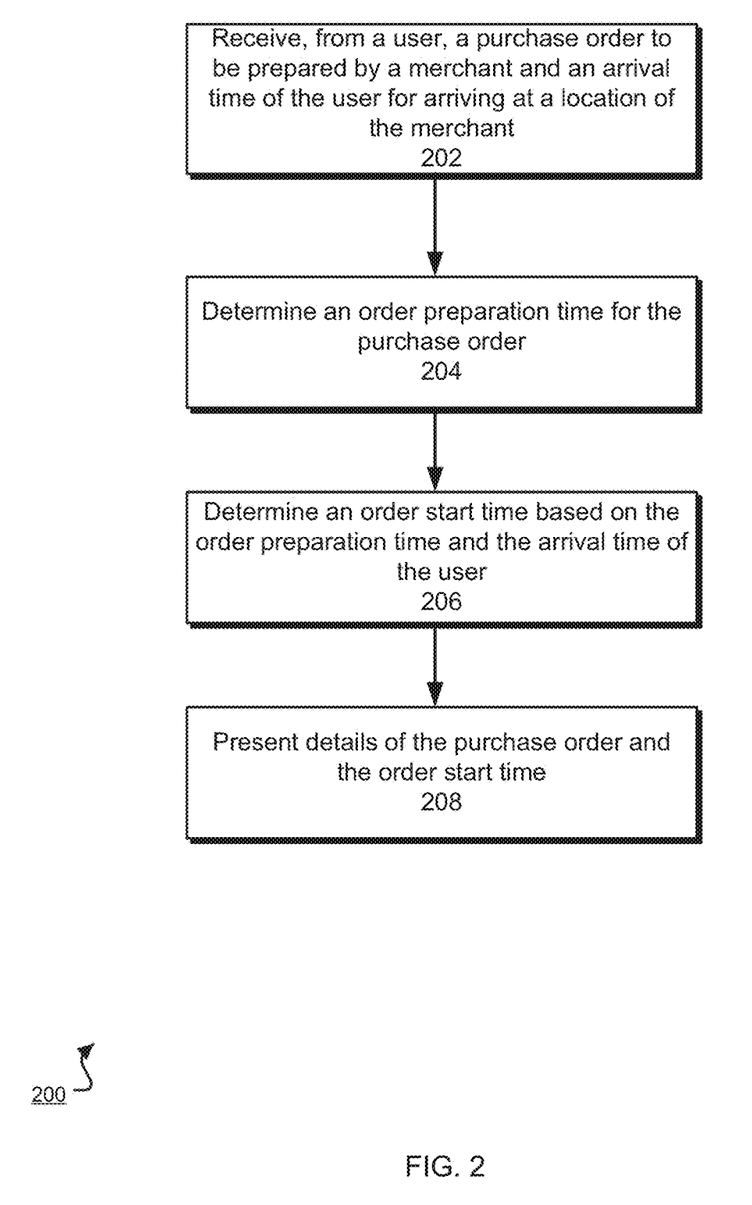
FIG. 2 is a flow diagram of an example process for determining an order start time for a purchase order.

FIG. 2 illustrates an example process 200 for determining an order start time for a purchaser order. The example process 200 is provided merely as an example and additional or fewer steps may be performed in similar or alternative orders, or in parallel, within the scope of the various embodiments described in this specification. A computing device receives, from a user device, data describing a purchase order to be prepared by a merchant and an expected arrival time of the user for arriving at a geographic location of the merchant 202. The purchase order specifies one or more items that were selected by the user for purchase from an electronic catalogue. The electronic catalogue can be a catalogue that includes items sold only by the merchant or a generic catalogue that includes items sold by the merchant as well as other items sold by other merchants. Further, the expected arrival time of the user is determined based on a geographic location of the user device, as described above.

The computing device determines an order preparation time for the purchase order based on the one or more items specified in the purchase order 204. The order preparation time is a time needed by the merchant to prepare the purchase order. The computing device determines an order start time based on the order preparation time for the purchase order and on the expected arrival time 206. The order start time is a time for beginning preparation of the purchase order to have the purchase order ready at the expected arrival time. The computing device presents the data describing the purchase order and the order start time 208.

Figure 3:
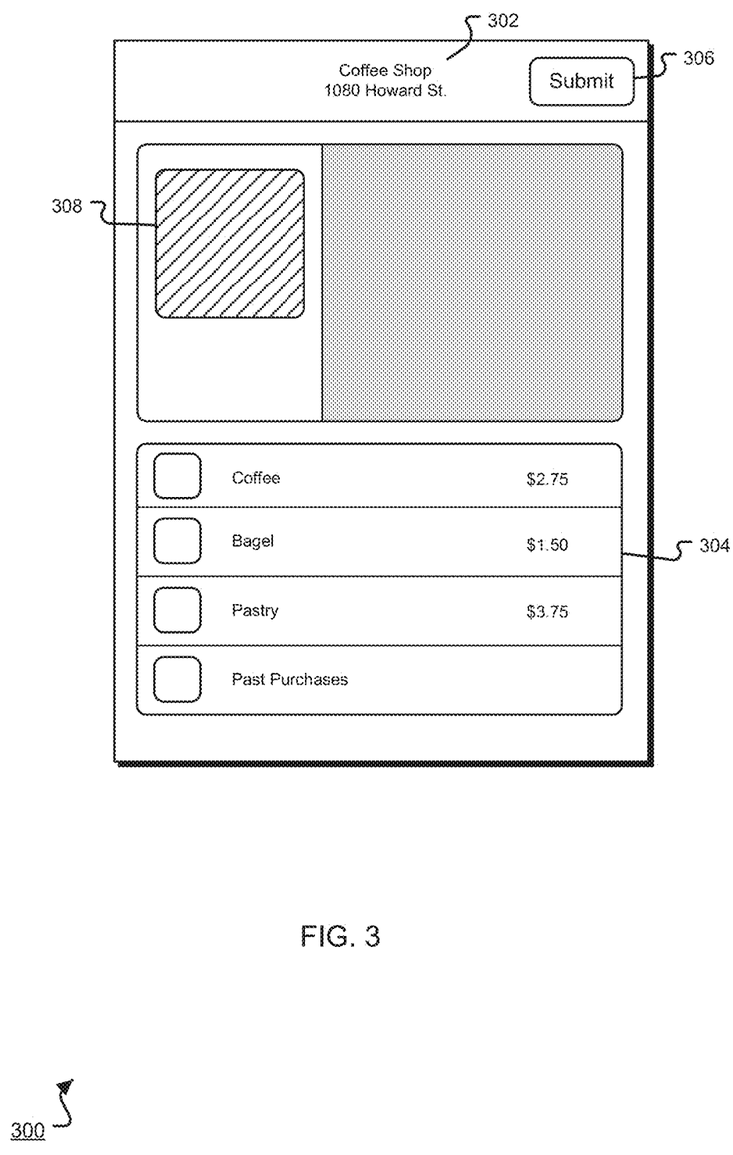
FIG. 3 illustrates an example view of a user application displaying an electronic catalogue of items.

FIG. 3 illustrates an example view of a user application 300 displaying an electronic catalogue of items 304. The user application 300 can be running on a user device, e.g., the user device 102, as described above. The electronic catalogue describes items 304 that are available for purchase from the merchant 302. A user interacting with the user application 300 can select one or more items 304 from the electronic catalogue for purchase. Once items are selected, the user can select a submit option 306 to send the user's purchase order for the selected items to the merchant 302 for preparation. In some embodiments, when the user submits the purchase order, the user device sends, e.g., to the ordering server 107 or a merchant device of the merchant, data describing the purchase order and the user's location data, as described above. The user application 300 may also be formatted using a merchant logo 308 and a color motif specified by the merchant, as described above.

Figure 4:
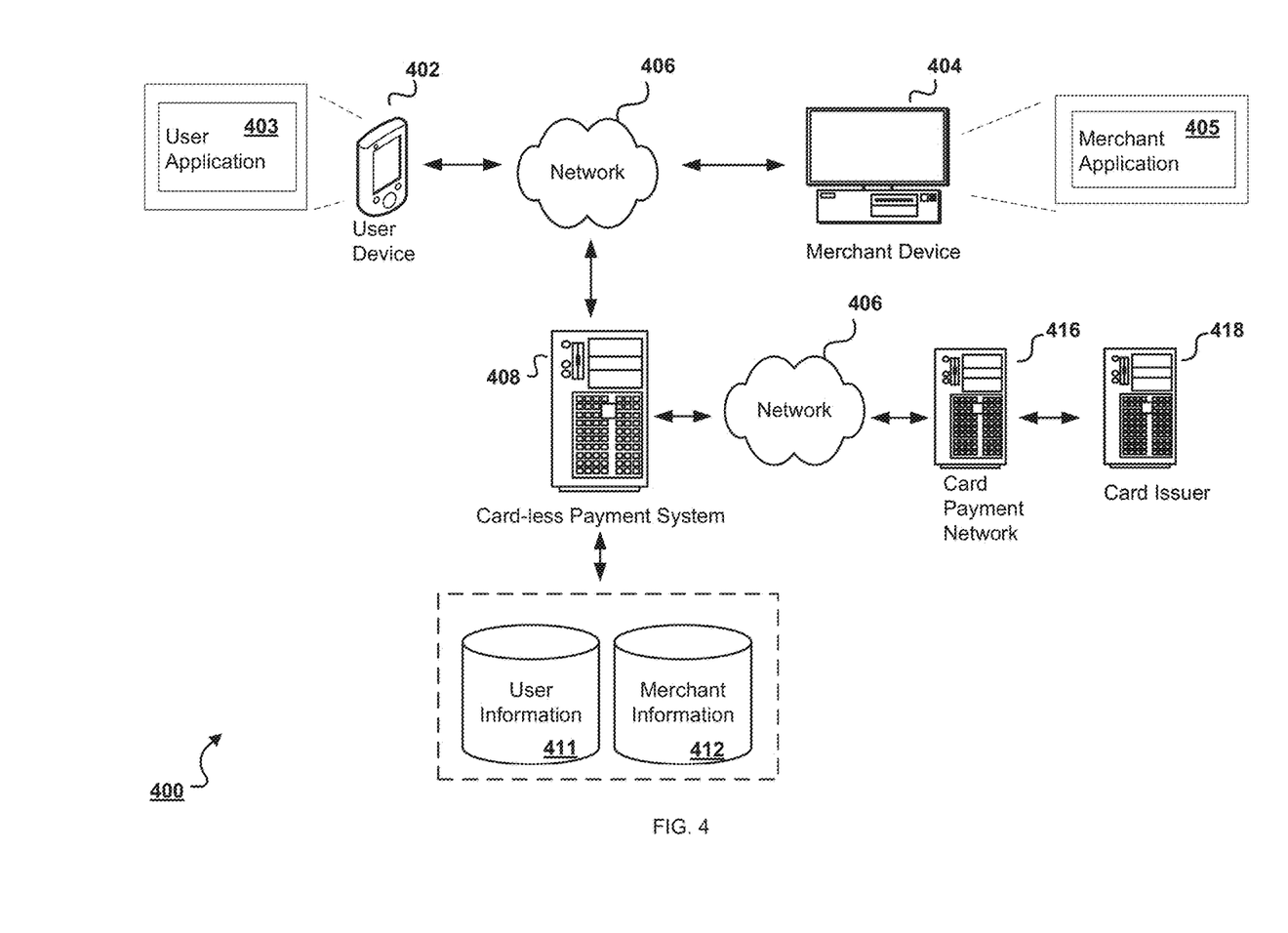
FIG. 4 illustrates an example of an environment for implementing a card-less payment system.

FIG. 4 illustrates an example of an environment 400 for implementing a card-less payment system 408. Although a mobile device environment is described for purposes of explanation, different environments may be used, e.g., a web-based environment, to implement various embodiments.

The example environment 400 includes a card-less payment system 408, which can be implemented as computer programs on one or more computers in one or more locations, in which the systems, components, and techniques described below can be implemented. The example environment 400 also includes a user device 402 and a merchant device 404.

As used in this specification, a card-less payment transaction is a transaction conducted between a user and a merchant at a point-of-sale during which a financial account of the user is charged without the user having to physically present the financial payment card to the merchant at the point-of-sale. That is, the merchant need not receive any details about the financial account, e.g., the credit card issuer or credit card number, for the transaction to be processed.

The user device 402 and the merchant device 404 can each be a computer coupled to the card-less payment system 408 through a data communication network 406, e.g., the Internet. The user device 402 and the merchant device 404 each generally include a memory, e.g., a random access memory (RAM), for storing instructions and data, and a processor for executing stored instructions. The user device 402 and the merchant device 404 can each include one or more components, e.g., software or hardware, that are configured to respectively determine a geographic location of the user device 402 or the merchant device 404, using, for example, various geolocation techniques, e.g., a global positioning system (GPS). Further, the user device 402 and the merchant device 404 can each be any appropriate device operable to send and receive requests, messages, or other types of information over the network 406. Some examples of user devices include personal computers, cellular phones, handheld messaging devices, laptop computers, personal data assistants, tablet devices, and the like.

The network 406 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The card-less payment system 408, the merchant device 404, and the user device 402 can communicate over the network using wired or wireless connections, and combinations thereof.

Before conducting card-less payment transactions, a user typically creates a user account with the card-less payment system 408. The user can create the user account, for example, by interacting with a user application 403 that is configured to perform card-less payment transactions and that is running on the user device 402. When creating a user account with the card-less payment system 408, the user will typically provide a portrait of the user and data describing a financial account of the user, e.g., credit card number, expiration date, and a billing address. This user information can be securely stored by the card-less payment system 408, for example, in a user information database 411. To accept card-less payment transactions, a merchant typically creates a merchant account with the card-less payment system 408 by providing information describing the merchant including, for example, a merchant name, contact information, e.g., telephone numbers, the merchant's geographic location address, and one or more financial accounts to which funds collected from users will be deposited. This merchant information can be securely stored by the card-less payment system 408, for example, in a merchant information database 412.

The card-less payment system 408 is configured to perform card-less payment transactions. The card-less payment system 408 can include one or more servers that are configured to securely perform electronic financial transactions, e.g., electronic payment transactions, between a user and a merchant, for example, through data communicated between the user device 402 and the merchant device 404. Generally, when a user and a merchant enter into an electronic financial transaction, the transaction is processed by transferring funds from a financial account associated with the user account to a financial account associated with the merchant account.

The card-less payment system 408 is configured to send and receive data to and from the user device 402 and the merchant device 404. For example, the card-less payment system 408 can be configured to send data describing merchants to the user device 402 using, for example, the information stored in the merchant information database 412. For example, the card-less payment system 408 can communicate data describing merchants that are within a threshold geographic distance from a geographic location of the user device 402, as described in this specification. The data describing merchants can include, for example, a merchant name, geographic location, contact information, and an electronic catalogue, e.g., a menu, that describes items that are available for purchase from the merchant.

In some embodiments, the card-less payment system 408 is configured to determine whether a geographic location of the user device 402 is within a threshold geographic distance from a geographic location of the merchant device 404. The card-less payment system 408 can determine a geographic location of the user device 402 using, for example, geolocation data provided by the user device 402. Similarly, the card-less payment system 408 can determine a geographic location of the merchant device 404 using, for example, geolocation data provided by the merchant device 404 or using a geographic address, e.g., street address, provided by the merchant. Depending on the implementation, the threshold geographic distance can be specified by the card-less payment system 408 or by the merchant.

Determining whether the user device 402 is within a threshold geographic distance of the merchant device 404 can be accomplished in different ways including, for example, determining whether the user device 402 is within a threshold geographic radius of the merchant device 404, determining whether the user device 402 is within a particular geofence, or determining whether the user device 402 can communicate with the merchant device 404 using a specified wireless technology, e.g., Bluetooth or Bluetooth low energy (BLE). In some embodiments, the card-less payment system 408 restricts card-less payment transactions between the user and the merchant to situations where the geographic location of the user device 402 is within a threshold geographic distance from a geographic location of the merchant device 404.

The card-less payment system 408 can also be configured to communicate with a computer system 416 of a card payment network, e.g., Visa or MasterCard, over the network 406, or over a different network, for example, to conduct electronic financial transactions. The computer system 416 of the card payment network can communicate with a computer system 418 of a card issuer, e.g., a bank. There may be computer systems of other entities, e.g., the card acquirer, between the card-less payment system 408 and the computer system 418 of the card issuer.

The user operating the user device 402 that is within a threshold geographic distance of a particular merchant can interact with a user application 403 running on the user device 402 to conduct a card-less payment transaction. While interacting with the user application 403, the user can select the particular merchant, from a listing of merchants, with whom the user wants to enter into a card-less payment transaction. The user can select the particular merchant, for example, by selecting a "check in" option associated with the particular merchant. The user device 402 can communicate data notifying the card-less payment system 408 that the user has checked in with the merchant. In response, the card-less payment system 408 can communicate data to notify the merchant device 404 that the user has checked in. A merchant application 405 running on the merchant device 404 can notify the particular merchant that the user has electronically checked in with the particular merchant through a display screen of the merchant device 404.

Once checked in, the user can collect, or request, items that are available for purchase from the merchant. When the user is ready to enter into the card-less payment transaction, the user can, for example, approach a point-of-sale for the merchant and identify him or herself. For example, the user can verbally notify the merchant that the user wants to enter into a card-less payment transaction and can provide the merchant with the user's name. The merchant can then interact with the merchant application 405 to select the user, from a listing of users that have checked in with the merchant, to initiate a card-less payment transaction for the items being purchased by the user. For example, the merchant can determine a total amount to bill the user for the items being purchased. The user can verbally approve the total amount to be billed and, in response, the merchant can submit a request for a card-less payment transaction for the total amount to the card-less payment system 408. In response, the card-less payment system 408 can obtain, for example, from the user information database 411, data describing a financial account associated with a user account of the user to which the total amount will be billed.

The card-less payment system 408 can then communicate with the computer system 416 of a card payment network to complete an electronic financial transaction for the total amount to be billed to the user's financial account. Once the electronic financial transaction is complete, the card-less payment system 408 can communicate data describing the card-less payment transaction to the user device 402, e.g., an electronic receipt, which can, for example, notify the user of the total amount billed to the user for the card-less payment transaction with the particular merchant.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, the method comprising:

providing, by a remote ordering system and to a computing device of a remote purchaser, a listing of merchants that accept purchase orders for remotely ordered items available for pickup or delivery, wherein the remote purchaser is able to access the listing of merchants through an application executing on the computing device;

sending to the computing device, a menu of items available to purchase from a merchant in the listing of merchants;

receiving, from the computing device by the remote ordering system, data describing a purchase order for at least one item selected by the computing device from the menu of items available for purchase from the merchant and receiving data describing a location of the remote purchaser, wherein the remote purchaser is not at the location of the merchant;

sending, by the remote ordering system to a merchant device, data describing the purchase order for the at least one item and the data describing the location of the remote purchaser;

receiving, from the merchant device and by the remote ordering system, an estimated time of completion for preparation of the purchase order, wherein the estimated time of completion is based on a prioritization of the purchase order by the merchant device, wherein the prioritization is based on the data describing the location of the remote purchaser and an amount of time needed to prepare the at least one item described in the purchase order;

sending, from the remote ordering system and to the computing device, the estimated completion time for the purchase order;

receiving, by the remote ordering system and from the computer device, a purchaser check-in indicating that the remote purchaser is present within the location of the merchant;

receiving from the merchant device and by the remote ordering system, a revised estimated time of completion based on a reprioritization of the purchase order based on the purchaser check-in;

sending, from the remote ordering system to the computing device or the remote purchaser an updated time of completion based on the revised estimated time of completion;

sending, from the remote ordering system and to the merchant device, a notification of the purchaser check-in, and an prompt to provide the at least one item to the remote purchaser.

2. The computer-implemented method of claim 1, wherein the estimated time of completion for preparation of the purchase order is determined based at least in part on an amount of time needed by the merchant to prepare the at least one item specified in the purchase order.

3. The computer-implemented method of claim 2, comprising:
determining a geographic location of the remote purchaser, wherein the remote purchaser is not at a geographic location of the merchant;
adjusting the estimated time of completion based at least in part on the geographic location of the remote purchaser and an amount of time needed by the merchant to prepare the at least one item so that the order is ready upon arrival of the remote purchaser at a geographic location of the merchant.

4. The computer-implemented method of claim 1, wherein the estimated time of completion is adjusted based on a delay parameter specified by the merchant.

5. The computer-implemented method of claim 1, further comprising:
providing, by the remote ordering system and to the merchant device, data describing a geographic map that indicates respective geographic locations of one or more customers that have placed purchase orders with the merchant.

6. The computer-implemented method of claim 1, comprising:
receiving a message from the remote purchaser regarding an expected arrival time; and
adjusting the estimated time of completion based on the expected arrival time.

7. The computer-implemented method of claim 1, comprising:
providing an interactive map to the merchant device, the interactive map identifying each remote purchaser on a geographic map as a selectable icon that when selected can provide details describing the order data of the remoted purchaser.

8. The computer-implemented method of claim 1, comprising:

receiving from the computing device a check-in communication when the computing device is within a predetermined distance from the merchant;
after receiving the check-in communication, performing processing of a financial transaction as a cardless transaction.

9. A computer-implemented method, the method comprising:
providing, by a remote ordering system to a computing device of a remote purchaser, a listing of merchants, each merchant having one or more items that are available for purchase;
sending to the computing device of the remote purchaser, a menu of the one or more items that are available for purchase from a first merchant in the listing of merchants;
receiving, by the remote ordering system from the computing device, data describing an order for at least one item from the menu that is available for purchase from the first merchant in the listing of merchants, and receiving data describing an estimated arrival time of the remote purchaser at the merchant, wherein the estimated arrival time of the remote purchaser is determined by the computing device;
sending, by the remote ordering system to a merchant device of the first merchant, data describing the order received from the customer and the data describing the estimated arrival time of the remote purchaser; and
receiving, from the merchant device and by the remote ordering system, an estimated time of completion for preparation of the purchase order, wherein the estimated time of completion is based on a prioritization of the purchase order by the merchant device, wherein the prioritization is based on the data describing the estimated arrival time of the remote purchaser and an amount of time needed to prepare the at least one item described in the purchase order.

10. The computer-implemented method of claim 9, further comprising:
sending, from the remote ordering system and to the computing device, the estimated time of completion for preparation of the order.

11. The computer-implemented method of claim 10, further comprising:
determining a geographic location of the customer;
adjusting the estimated time of completion based at least in part on the geographic location of the remote purchaser and an amount of time needed by the first merchant to prepare the at least one item so that the order is ready upon arrival of the remote purchaser at a geographic location of the first merchant.

12. The computer-implemented method of claim 10, further comprising:
adjusting the estimated time of completion based at least in part on the estimated time of arrival of the remote purchaser and an amount of time needed by the first merchant to prepare the at least one item so that the order is ready upon arrival of the remote purchaser at a geographic location of the first merchant.

13. The computer-implemented method of claim 10, wherein the remote purchaser is able to access the listing of merchants through an application executing on the computing device.

14. The computer-implemented method of claim 13, wherein the application is configured to store data describing at least one financial payment instrument of the remote purchaser, and wherein the application is able to utilize the data describing the at least one financial payment instrument to facilitate a financial transaction between the first merchant and the remote purchaser for the order.

15. The computer-implemented method of claim 9, further comprising:
sending, to the merchant device and by the remote ordering system, an order start time for beginning preparation of the order to have the order ready upon arrival of the remote purchaser at a geographic location of the first merchant.

16. The computer-implemented method of claim 9, further comprising:
determining that the remote purchaser is within a threshold range from a geographic location of the first merchant; and
providing an electronic bill for the order to the computing device of the remote purchaser.

17. The computer-implemented method of claim 9, further comprising:
determining that the remote purchaser is within a threshold range from a geographic location of the first merchant; and
sending, to the merchant device and by the remote ordering system, a notification to bring the order to an order pick-up counter at the geographic location of the first merchant.

18. The computer-implemented method of claim 9, further comprising:
determining, based on the estimated arrival time, that the remote purchaser is no longer within a threshold range from a geographic location of the first merchant; and
sending, to the computing device, at least one of: a feedback request for the first merchant, one or more digital coupons, or an offer to enroll in a rewards program with the first merchant.

19. A merchant device in communication with a remote ordering system comprising:
at least one storage having instructions thereon, that when executed cause the merchant device to:
receive, by the merchant device from the remote ordering system, data describing a purchase order for at least one item selected by a computing device in communication with the remote ordering system from a menu of items available for purchase from a merchant operating the merchant device, and receive, by the merchant device from the remote ordering system, data describing a location of the computing device, wherein the computing device is not at the location of the merchant;
determine, by the merchant device an estimated time of completion for preparation of the purchase order wherein the estimated time of completion is based on a prioritization of the purchase order relative to another purchase order by the merchant device, wherein the prioritization is based on the data describing the location of the computing device and an amount of time needed to prepare the at least one item described in the purchase order;
send from the merchant device to the remote ordering system, the estimated completion time for the purchase order;
receive a check-in from the computing device indicating that the computing device is present within the location of the merchant; and
revise the estimated time of completion based on a reprioritization of the purchase order based on the check-in.

20. The merchant device of claim 19, wherein the instructions cause the merchant device to:
send the revised estimated time of completion to the remote ordering system for forwarding to the computing device.

* * * * *